Figure 1:
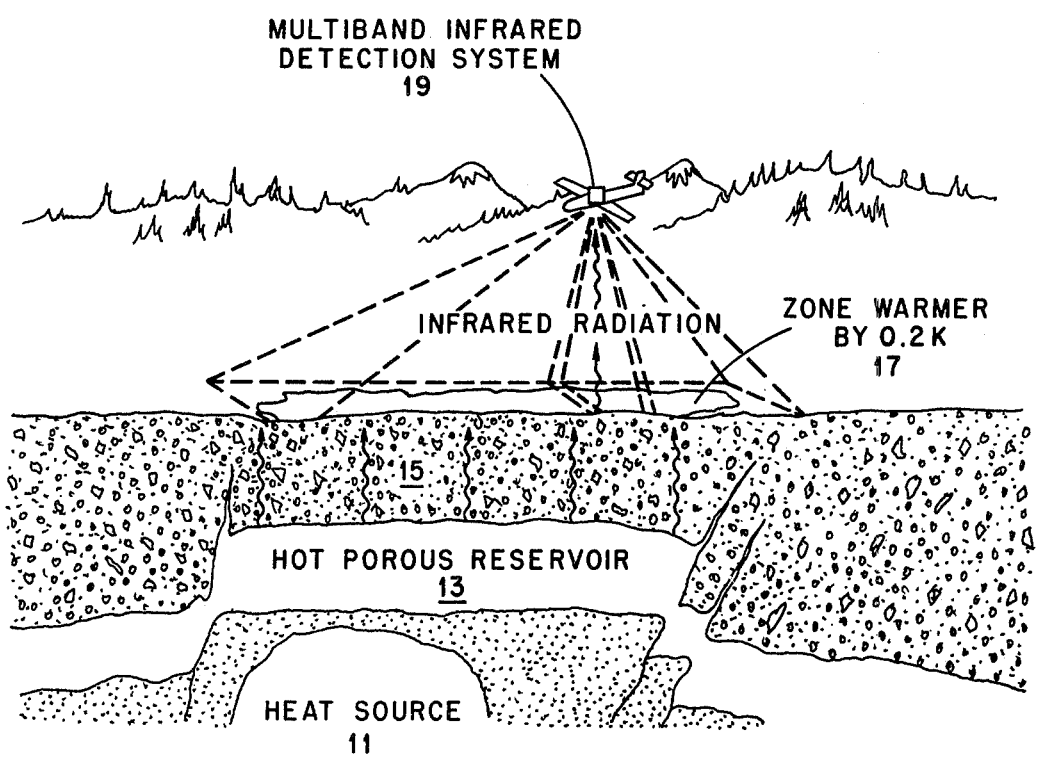

United States Patent [19]
Del Grande

[11] 4,005,289
[45] Jan. 25, 1977

[54] METHOD FOR IDENTIFYING ANOMALOUS TERRESTRIAL HEAT FLOWS

[75] Inventor: Nancy Kerr Del Grande, San Leandro, Calif.

[73] Assignee: The United States of America as represented by the United States Energy Research and Development Administration, Washington, D.C.

[22] Filed: Jan. 5, 1976

[21] Appl. No.: 646,444

[52] U.S. Cl. .............................. 250/253; 250/339
[51] Int. Cl.² ........................................ G01V 5/00
[58] Field of Search ........................... 250/253, 339

[56] References Cited
UNITED STATES PATENTS

| | | | |
|---|---|---|---|
| 3,278,746 | 10/1966 | Fiat | 250/253 |
| 3,373,281 | 3/1968 | McAlister | 250/253 |

*Primary Examiner*—Davis L. Willis
*Attorney, Agent, or Firm*—Dean E. Carlson; Roger S. Gaither; Clifton E. Clouse

[57] ABSTRACT

A method for locating and mapping the magnitude and extent of terrestrial heat-flow anomalies from 5 to 50 times average with a tenfold improved sensitivity over orthodox applications of aerial temperature-sensing surveys as used for geothermal reconnaissance. The method remotely senses surface temperature anomalies such as occur from geothermal resources or oxidizing ore bodies by: measuring the spectral, spatial, statistical, thermal, and temporal features characterizing infrared radiation emitted by natural terrestrial surfaces; deriving from these measurements the true surface temperature with uncertainties as small as 0.05 to 0.5 K; removing effects related to natural temperature variations of topographic, hydrologic, or meteoric origin, the surface composition, detector noise, and atmospheric conditions; factoring out the ambient normal-surface temperature for non-thermally enhanced areas surveyed under otherwise identical environmental conditions; distinguishing significant residual temperature enhancements characteristic of anomalous heat flows and mapping the extent and magnitude of anomalous heat flows where they occur.

7 Claims, 6 Drawing Figures

RADIATION SIGNAL RESPONSE TO TEMPERATURE VARIATIONS

METHOD FOR IDENTIFYING ANOMALOUS TERRESTRIAL HEAT FLOWS

This invention was made under, or in, the course of Contract No. W-7405-ENG-48 with the United States Energy Research and Development Administration.

BACKGROUND OF THE INVENTION

The present invention relates to an improved method for locating and mapping anomalous terrestrial heat flows such as occur from geothermal resources oxidizing ore bodies, unknown subterranean heat sources or heat sinks, man's environmental surroundings, and atmospheric hydrological heat sources and sinks that transfer a small, telltale temperature anomaly to the surface terrain, by characterizing the spectral, spatial, statistical, thermal, and temporal features of radiation emitted by natural terrestrial surfaces with sufficient accuracy to remove ambient, normal-surface effects.

Geothermal resources offer a promising, economically competitive, new energy source which would be developed more readily as a result of this invention. The U.S. goal is to stimulate commercial production of 20 GW of geothermal power by 1985. This would save the equivalent of 10 billion barrels of oil. The potentially valuable geothermal resource base occupies a vast 390,000 km² of land throughout the western third of the conterminous U.S. However, little is known of the exact location, size, or potential of promising resource areas characterized by anomalous heat flows from 50 to 50 times average. Detailed surface thermal surveys needed to assess these areas are impractical until we develop more effective and less costly exploration methods.

To interest utilities in developing a new geothermal field, at least two years and $3 to $6 million must be spent proving that the field has a potential of 200 to 400 MW. Near-surface heat flow measurements, requiring about 60 man-years per 100 km², necessitate a speculative investment of some 1 or 2 y and $2 or $3 million prior to deep exploratory drilling of areas without proven potential. Commercial enterprises are reluctant to make these speculative investments. An effective aerial temperature-sensing survey method for locating and mapping geothermal resources with near-surface heat flows from 5 to 50 times normal would reduce to a small fraction the cost (in both time and money) of existing methods. This would make practical large-scale evaluations of geothermal resources and stimulate commercial power developments.

Orthodox applications of aerial temperature-sensing surveys have been ineffective for locating or mapping geothermal heat-flow anomalies less than 50 to 500 times the global average (1.5 $\mu$cal cm$^{-2}$ s$^{-1}$). The problem is: the true surface temperature for most natural surfaces cannot be derived from the measurements; available instrumentation is not specifically designed to minimize radiometric noise for accurately measuring surface temperature enhancements as small as 0.05 to 0.5 K over areas larger than 0.1 km² or for detecting from two to five simultaneously measured atmospheric infrared bands where radiation emitted by natural surfaces (e.g, vegetated areas, sands, clay minerals, soils, rocks, and water) behaves as a featureless (graybody) spectral source; furthermore, standard procedures for interpreting the data from infrared surveys offer no way of correcting for the effects of surface emissivity variations (equivalent to temperature uncertainties of 0.5 to 5 K) assoiciated with natural terrestrial surfaces, or the intervening atmospheric path, or for reflected sky radiation; in addition, the measurement procedures are not usually optimized to reduce the effects of normal temperature variations associated with atmospheric conditions, hydrological and topographical variations, and surface compositional differences; and further, it has been assumed by many an unattainable goal to distinguish both real and apparent thermal anomalies associated with non-geothermal effects from true surface temperature enhancements resulting from subterranean sources of heat.

SUMMARY OF THE INVENTION

This invention is a method for identifying, locating and mapping anomalous terrestrial heat flows from subterranean or other heat sources (e.g., geothermal resources or oxidizing ore bodies) that enhance the surface temperature of large areas, 0.05 to 0.5 K above the ambient normal-surface temperature.

This method can be specifically carried out by the following means:

1. Modifying a dual-band airborne electro-optical scanning system to simultaneously detect from two to five infrared radiation bands, particularly those including the intervals: 2.0–2.4, 3.3–3.7, 3.7–4.1, 4.6–5.0, and 13.0–13.4 $\mu$m where natural surfaces emit radiation with spectral features described by Planck's Radiation Law; with associated noise-equivalent-temperatures less than 0.02 K and with radiometric noise less than 0.1% for fields of view greater than 0.1 km².

2. Taking aerial infrared survey measurements with the modified dual-band detection system, under specified environmental conditions, on successive occasions, to sufficiently characterize the spatial, spectral, thermal, temporal, and statistical features of the infrared radiation emitted by natural terrestrial surfaces for discerning 0.05 to 0.5 K temperature enhancements from subterranean or other heat sources that extend over areas larger than 0.1 km² and produce anomalous heat flows from 8 to 80 $\mu$cal cm$^{-2}$ s$^{-1}$.

3. Analytically processing a selected set of sufficiently characterized infrared survey data; obtaining from one to ten signal ratio combinations; correcting these signal ratios for surface emissivity variations, atmospheric transmissivity effects and reflected radiation backgrounds; and mapping the resulting measured surface temperature contours.

4. Simulating or otherwise determining from the survey measurements the ambient normal-surface temperature contours for nonthermal areas with equivalent environmental surroundings based on the following measured and estimated parameters: surface albedo, roughness length and wetness; soil thermal diffusivity and heat capacity; mean air temperature, relative humidity and wind speed; precipitable water, sky radiant temperature, and dust particle density; station pressure and latitude; orbital radius vector and solar declination.

5. Identifying, locating and mapping the extent and magnitude of anomalous terrestrial heat flows where residual surface temperature enhancements of statistical significance result when the simulated normal surface temperature contours are subtracted from the measured and corrected surface temperature contours and display the appropriate spatial and temporal characteristcs associated with the sought-after heat sources or heat sinks.

It is the object of the invention to provide a rapid, cost-effective, aerial survey method and supplementary procedures for locating geothermal areas oxidizing ore bodies and unknown subterranean heat sources and mapping the magnitude and extent of heat flows from 5 to 50 times average.

Another object is to provide an aerial survey method specifically designed to measure the true average surface temperature, for areas larger than 0.1 km$^2$, to within 0.05 to 0.5 K of the value obtainable with precisely calibrated surface-contact thermister measurements.

Another object is to provide a procedure for identifying the spatial, spectral, temporal, thermal, and statistical features of infrared radiation emitted by natural terrestrial surfaces that characterize subterranean heat sources from geothermal resources or oxidizing ore bodies.

Another object is to provide a means for simulating or otherwise identifying the ambient normal-surface temperatures, resulting from meteorological, topographical, hydrological and soil thermal conditions that would occur in the absence of geothermal activity.

Another object is to identify optimized environmental conditions for conducting aerial surveys to enhance the detectability of surface thermal enhancements resulting from anomalous heat flows from 5 to 50 times average.

Another object is to identify from two to five infrared radiation bands that must be detected to remotely sense the true contact-temperature of natural surfaces, since at commonly used infrared radiation bands from 8 to 13 $\mu$m the Earth radiates as a specular source with a non-constant, unknown emissivity and the observed radiation measurements cannot be related to the surface temperature without introducing uncertainties equivalent from 0.5 to 5 K.

Another object of the invention is to describe a procedure to correct the survey data for surface emissivity, atmospheric transmission, and reflected sky radiation effects.

Other objects and advantageous features of the invention will be apparent in a description of a specific embodiment thereof, given by way of example only, to enable one skilled in the art to readily practice the invention which is described hereinafter with reference to the accompanying drawings.

FIG. 1: An example of an aerial survey method to detect infrared radiation which when analyzed can be used to locate and map the magnitude and extent of weak heat flow anomalies from subterranean sources of heat such as geothermal resources or oxidizing ore bodies according to the invention.

Figure 2:
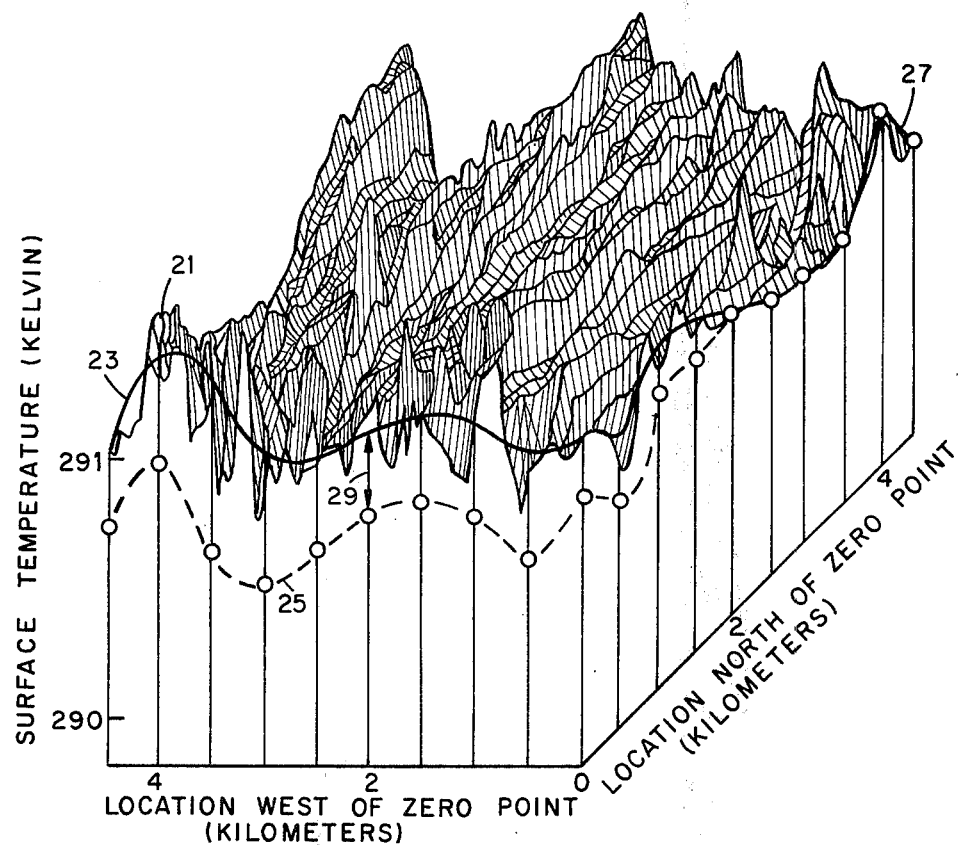

FIG. 2: An example of a three dimensional surface-temperature map showing a location where the surface temperature is higher than the ambient, normal-surface temperature of a nearby area where there is no anomalous subterranean geothermal heat according to the invention.

Figure 3:
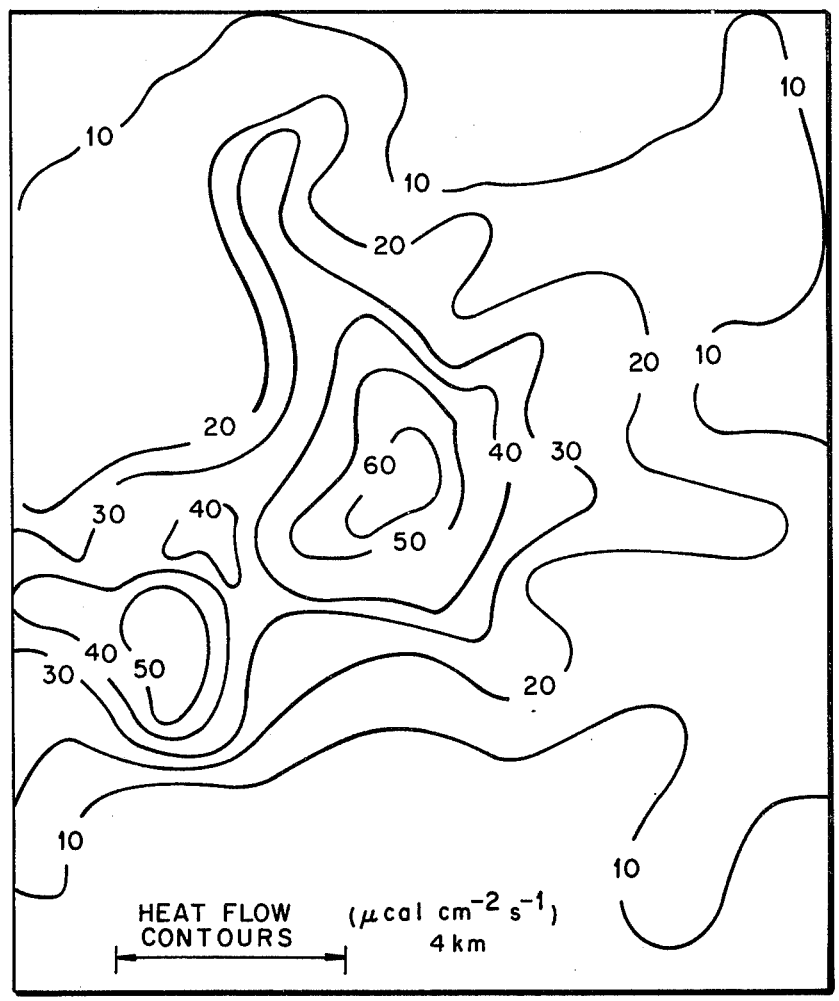

FIG. 3: An example of a contour map showing the magnitude and extent of a geothermal heat-flow anomaly measured according to the invention.

Figure 4:
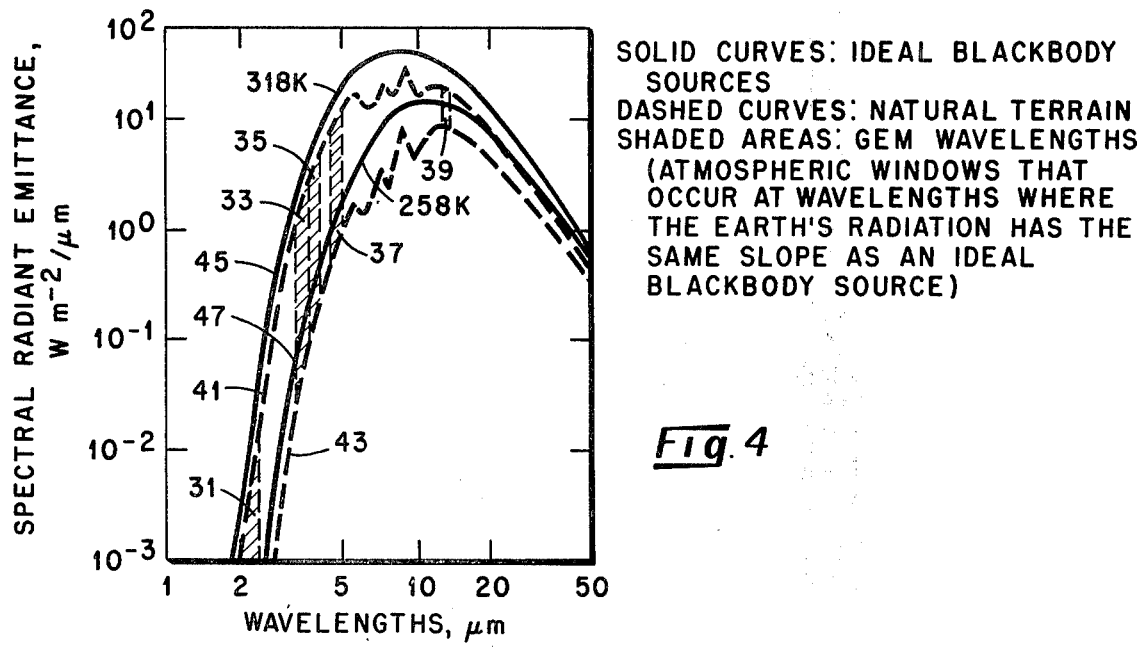

FIG. 4: A diagram showing infrared radiation bands that when ratioed can be related to the true surface temperature to provide accurate surface temperature values according to the invention.

Figure 5:
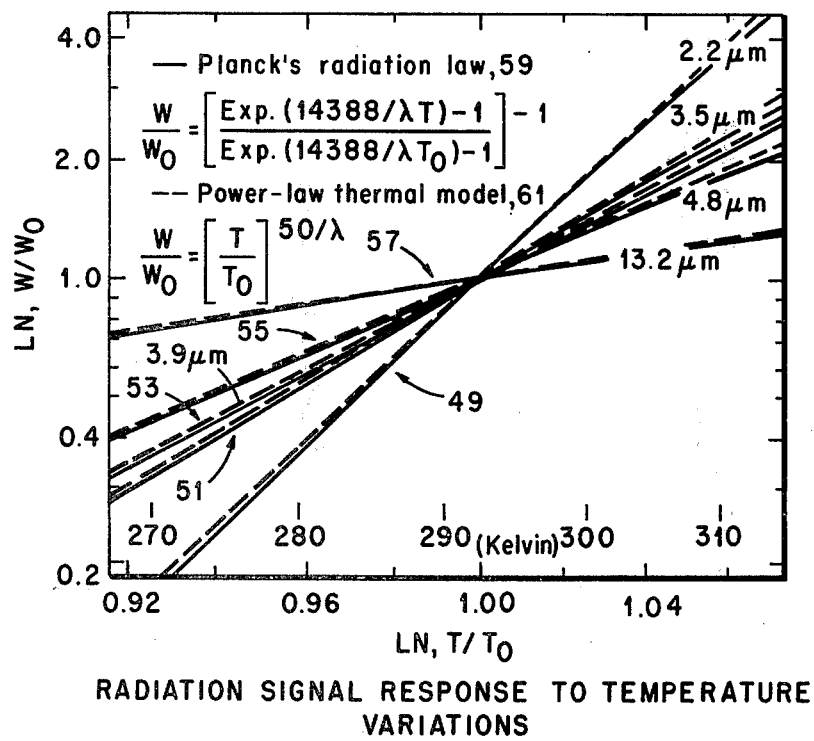

FIG. 5: A diagram showing that the radiation signal responses, $W_i/W_o$ and $W_j/W_o$, to temperature variations, $T/T_o$, at wavelengths, $\lambda_i$ and $\lambda_j$, vary as $T/T_o$ to the power $(50/\lambda_i)$ and $(50/\lambda_j)$ so that the ratio $W_i/W_j$ when raised to the power $(50/\lambda_i - 50/\lambda_j)^{-1}$ can be directly related to the temperature of the radiating source for a calibrated dual-band infrared system modified for use in accordance with the invention.

Figure 6:
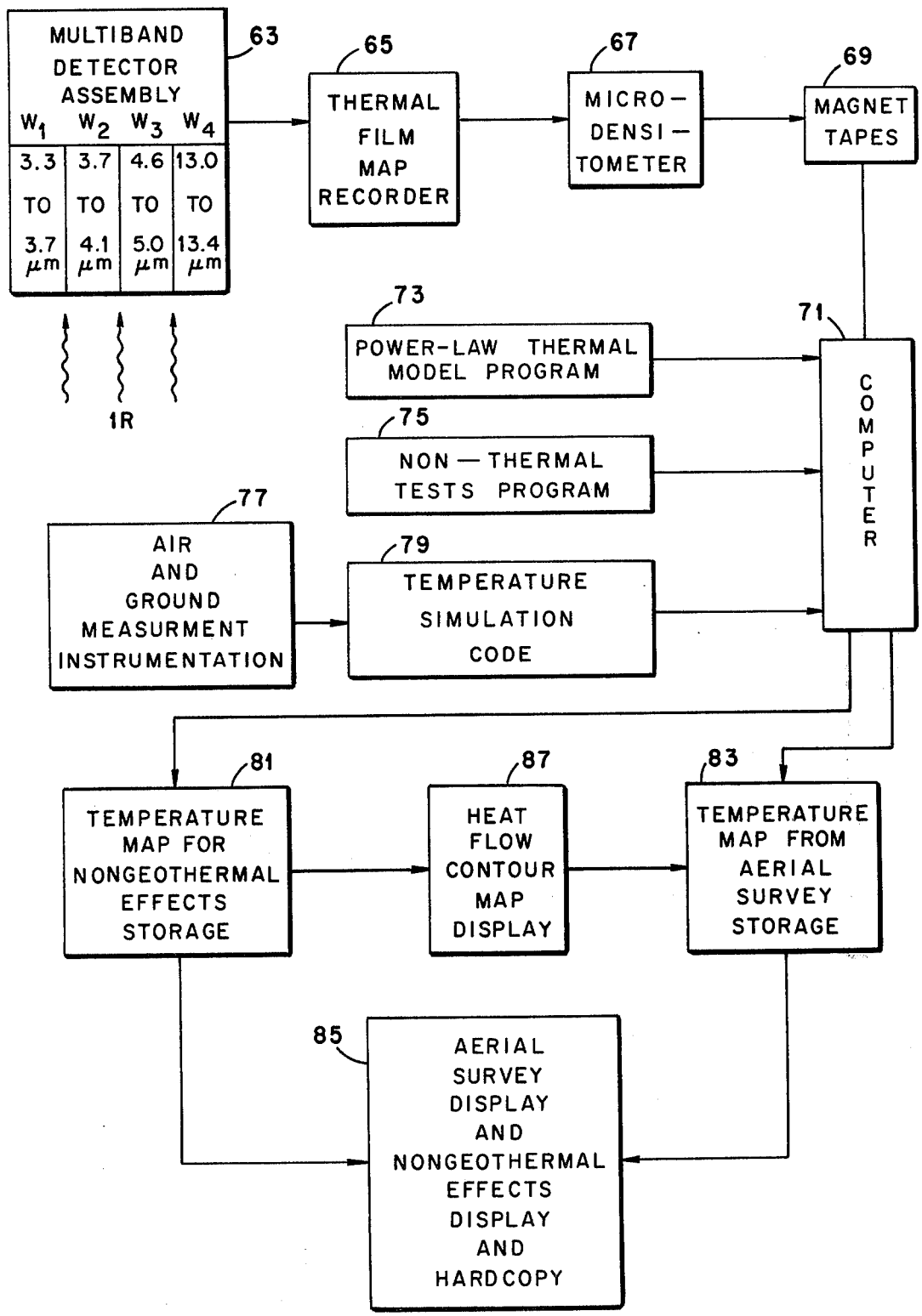

FIG. 6: A block diagram of a system for deriving contours of the extent and magnitude of geothermal heat flow anomalies from 5 to 50 times average and for relating infrared signal ratios to the true surface temperature of natural terrestrial surfaces with uncertainties as small as 0.05 to 0.5 K is shown to describe the invention.

DESCRIPTION OF AN EMBODIMENT

Referring to the drawings, there is shown in FIG. 1 a subterranean heat source 11 and a hot porous reservoir 13 producing a weak, surface geothermal heat flow anomaly 15 and surface temperature enhancement 17 located above the geothermal reservoir. The multiband infrared detection system 19 is an electro-optical line scanner that detects filtered infrared radiation simultaneously at two or more wavelengths with two or more infrared-sensitive detectors. The infrared signals when analyzed are related to the true surface temperature. FIG. 2 illustrates an area with measured true surface temperatures 21 and averaged true surface temperatures 23 that are higher than the normal surface temperature 25 associated with the environmental conditions of the survey affecting the surface energy budget and temperature of the ambient non-geothermal terrain 27. A statistically significant temperature anomaly is shown where the dashed and solid lines do not coincide 29. FIG. 3 illustrates a contour map which is obtained from the infrared survey data by relating statistically significant surface temperature enhancements to the subterranean heat flows necessary to produce them. Heat flows from 5 to 50 times average (1.5 $\mu$cal cm$^{-2}$s$^{-1}$) enhance the surface temperature 0.05 to 0.5 K. This follows as a result of the Stefan-Boltzmann Law.

FIG. 4 shows five bands of the infrared spectrum 31, 33, 35, 37, and 39, where most natural terrestrial surfaces (e.g., vegetated areas, sand, clay minerals, soil, rocks, and water) radiate with smooth spectral features charcterized by Planck's Radiation Law as shown by the dashed curves 41 and 43. The terrestrial radiation bands have the same slope as an ideal blackbody source at the same respective temperatures as shown by the solid curves 45 and 47. This is necessary to relate the infrared signals from any two bands to the true (graybody) surface temperature which would be measured using surface contact methods on the terrain. The surface emissivity is not generally known. Because of this, terrestrial radiation measured by one infrared band can only be related to an apparent (blackbody) temperature which is less than the true (graybody) temperature. When corrections are estimated for a single band system uncertainties associated with surface compositional differences are equivalent to 0.5 to 5 K or heat flows from 50 to 500 times average.

FIG. 5 shows a thermal feature characterizing infrared radiation signal responses at certain wavelengths: 49, 51, 53, 55, 57. Namely, the radiation signal responses from Planck's Law 59 are related to the temperature variations quite simply using the Power-Law Thermal model 61. Applying this formula 61 at two wavelengths: 3.5 and 13.2 $\mu$m, the signal ratio:

$W_{3.5}/W_{13.2}$, when raised to the power: $(50/3.5 - 50/13.2)^{-1}$, and multiplied by a calibration constant is directly related to the true divided by the ambient surface temperature, $T/T_o$. The emissivity dependence cancels out of the signal ratio parameter, which depends only on the surface temperature. Further, when $(50/\lambda_i - 50/\lambda_j)$ is a large number, the signal ratio $W_i/W_j$, which varies as $T/T_o$ to the power $(50/\lambda_i - 50/\lambda_j)$ is very sensitive to the temperature variations and provides an accurate surface temperature to the nearest 0.05 to 0.5 K as well as true (graybody) surface temperature measurement.

To derive temperature maps shown in FIG. 2 and heat flow contour maps shown in FIG. 3 by detecting at least two simultaneously measured infrared bands shown in FIG. 4 and FIG. 5 and relating the ratio of these two bands to the true surface temperature with Planck's law or the Power-Law Thermal Model shown in FIG. 5, reference is made to the block diagram shown in FIG. 6. FIG. 6 shows a system 63 for characterizing the spectral radiation characteristics at four wavelengths which would provide 6 signal ratio combinations uniquely related to the true surface temperature according to the Power-Law Thermal Model. An advantage for having six temperature values for a given area is that they could be averaged to improve the accuracy of the measurements. The infrared signals transduced by the detectors, for convenience are recorded either on films 65 which are converted to magnetic tapes 67, 69, or directly on magnetic tapes 69. The magnetic tapes 69 are used to store the data in the computer 71. The signal ratios are related to the true surface temperature 73. Their spatial, spectral, temporal, thermal and statistical features are tested 75 to remove signal variations with the wrong size, shape, periodicity, magnitude, or spectral features as to be inconsistent with the sought-after surface thermal anomaly or associated heat producing source (or heat removing sink). Analytical procedures (e.g., cluster analyses, pattern recognition Wiener filters and Fourier analyses) are used to specify a selected data set which is related to the surface temperature.

Further, ground truth and environmental measurements are taken 77 such as may be necessary to simulate the normal-surface temperature for ambient non-geothermal areas 79. The data is processed 71, 81, 83 with additional software programs necessary to obtain temperature and heat flow maps on hard copy displays 85, 87.

Measurements are taken under environmental conditions that do not obsure the sought-after thermal anomalies (i.e., predawn when the Earth's surface has equilibrated and when wind speeds are less than 3 m.p.h. whenever possible). Wind gusting is avoided. Heavy fog is avoided. Snow and ice covered regions are avoided. The data is corrected for minor surface emissivity variations, the intervening atmospheric path, and reflected sky radiation backgrounds as detailed in the references. The environmental effects producing normal-surface temperatures as a result of the surface energy budget can be estimated as detailed in the references when the ambient normal-surface temperatures are not apparent as an obvious result of the survey measurements.

Instrumental modifications, and method for obtaining low noise-equivalent-temperatures less than 0.02 K are described in the references. This involves taking advantage of the trade-off between spatial and thermal resolution since most heat sources are larger than 0.1 km$^2$; using large detectors; and averaging the signals over large areas to reduce the effect of statistical fluctuations for small terrestrial areas, when measurements are taken at wavelengths less than 5 μm. Cold filters are used to reduce ratiometric noise and limit the detected radiation to the required infrared wavelengths. In addition, the scanning speed of the electro-optical instrumentation is adjusted for optimum radiometric performance and less than 0.1% radiometric noise.

Surface contact temperature measurements at representative locations would be made to calibrate the system, as would ground based radiometric measurements to verify the emissivity responses of natural surfaces at the required infrared wavelengths.

The combined surface emissivity and radiometric noise effects, at specified radiation band wavelengths, when the radiometric noise is sufficiently reduced in accordance with established practices, are within the range 0.05 to 0.5 K, needed to distinguish heat flows from 5 to 50 times average.

Additional information related to the present invention may be had by reference to the following publications:

1. L. A. SeSchack and N. Kerr Del Grande, Using Airborne IR Data As A Geophysical Tool Is More Than Just Photo-Interpretation. Abstract of the paper presented at the 1975 joint American Society of Photogrammetry and American Congress on Surveying and Mapping Convention, Washington, D.C., March, 1975.
2. N. Kerr Del Grande, An Advanced Airborne Infrared Method For Evaluating Geothermal Resources. Paper presented at the Second United Nations Symposium on the Development and Use of Geothermal Resources. San Francisco, California, May 20–29, 1975 and included in the proceedings, May, 1975. Also see UCRL Report 76363.
3. N. Kerr Del Grande, "Aerial Prospecting For Geothermal Resources" from Lawrence Livermore Laboratory Energy and Technology Review, Section on Advanced Energy Systems, UCRL-62000-75-5, May, 1975.
4. L. A. LeSchack, N. Kerr Del Grande, S. I. Outcalt, J. Lewis, and C. Jenner, Correlation of Dual-Channel Airborne IR Data With Soil Moisture. Final report, Contract 4-35308 for N.O.A.A./N.E.S.S., May, 1975. Condensed version presented at the joint American Society of Photogrammetry and American Congress on Surveying and Mapping Convention, Phoenix, Arizona, October 26–31, 1975. Paper included in the proceedings, October, 1975.
5. N. Kerr Del Grande, The Geothermal Energy Multiband Concept For Aerial Geothermal Prospecting. Paper presented at the 45th Annual International Meeting of the Society of Exploration Geophysicists, Denver, Colorado, Oct. 12-16, 1975 and available or microfilm.
6. L. A. LeSchack and N. Kerr Del Grande, Dual-Wavelength Thermal Infrared Scanning As A Potential Airborne Geophysical Exploration Tool. Paper presented at the 45th Annual International Meeting of the Society of Exploration Geophysicists, Denver, Colorado, Oct. 12–16, 1975 and submitted for publication in "Geophysics".
7. N. Kerr Del Grande and F. J. Cook, Geothermal Resource Exploration Using Advanced Infrared Sensing. Paper presented at the 1975 Annual A.G.U. meeting in San Francisco, and Abstract published in E.O.S., December, 1975.

8. L. M. Larsen, Detector Utilization in Line Scanners. Infrared and Optics Department Willow Run Laboratories Report, NASA Contract No. NAS9-9784, University of Michigan, 1971.

While an embodiment of the invention has been shown and described, further embodiments or combinations of those described herein will be apparent to those skilled in the art without departing from the spirit of the invention. The essential features of the invention are the use of at least two specific infrared bands which when ratioed are related to the true surface temperature of natural terrestrial areas independent of their emissivity, and this when compared with the ambient normal-surface temperature for an area without anomalous geothermal heat flows can be related to the location extent and magnitude of the heat flow anomaly.

What is claimed is:

1. The method of locating and mapping the magnitude and extent of small anomalous terrestrial heat flows, comprising the steps of:
    a. detecting radiation emitted by areas of the Earth's surface;
    b. detecting at least two infrared bands where the spectral radiation is described by Planck's Radiation Law, at periodic intervals, as needed to characterize the spectral, spatial, thermal, temporal, and statistical radiation features of the terrestrial radiation;
    c. relating the ratio of at least two infrared bands to the true temperature of the surface terrain;
    d. determining the normal surface temperature for the ambient non-thermally modified terrain;
    e. locating and mapping areas where the true surface temperature is significantly different from the ambient normal-surface temperature;
    f. relating the statistically significant residual temperature difference to a heat flow anomaly;
    g. determining the magnitude and extent, and mapping the heat flow anomaly.

2. The method of claim 1, wherein said terrestrial heat flow anomaly characterizes a geothermal resource area.

3. The method of claim 1, wherein said terrestrial heat flow anomaly characterizes an oxiding ore body.

4. The method of claim 1, wherein said terrestrial heat flow anomaly characterizes an unknown subterranean heat source, peculiar to the location.

5. The method of claim 1, wherein said terrestrial heat flow anomaly characterizes a heat source, peculiar to the location, from man's environmental surroundings.

6. The method of claim 1, wherein said terrestrial heat flow anomaly characterizes a heat source, peculiar to the location, associated with an anomalous atmospheric effect.

7. The method of claim 1, wherein said terrestrial heat flow anomaly is negative (i.e., the true surface temperature is significantly less than the normal surface temperature) and the area is characterized by a heat sink such as might occur in association with subsurface aquifers or conditions related to the hydrological regime.

* * * * *